(12) United States Patent
Nishiyama

(10) Patent No.: US 8,468,171 B2
(45) Date of Patent: Jun. 18, 2013

(54) ATTRIBUTED KEY-VALUE-STORE DATABASE SYSTEM

(75) Inventor: Shuhei Nishiyama, Urayasu (JP)

(73) Assignee: Shuhei Nishiyama, Urayasu Chiba (JP)

( * ) Notice: Subject to any disclaimer, the term of this patent is extended or adjusted under 35 U.S.C. 154(b) by 462 days.

(21) Appl. No.: 12/829,390

(22) Filed: Jul. 2, 2010

(65) Prior Publication Data

US 2011/0004638 A1    Jan. 6, 2011

(30) Foreign Application Priority Data

Jul. 2, 2009  (JP) ................................ 2009-157366

(51) Int. Cl.
*G06F 7/00* (2006.01)
(52) U.S. Cl.
USPC .......................................... 707/793; 707/800
(58) Field of Classification Search
None
See application file for complete search history.

(56) References Cited

U.S. PATENT DOCUMENTS

| | | | | |
|---|---|---|---|---|
| 8,126,927 B1 * | 2/2012 | Binshtock et al. | ............ | 707/800 |
| 8,127,303 B2 * | 2/2012 | Kukanov et al. | ............ | 718/108 |
| 2003/0121030 A1 * | 6/2003 | Koob et al. | .................. | 717/152 |
| 2006/0149786 A1 | 7/2006 | Nishiyama | | |
| 2011/0010338 A1 | 1/2011 | Nishiyama | | |

FOREIGN PATENT DOCUMENTS

| | | |
|---|---|---|
| JP | 4158534 B2 | 8/2004 |
| JP | 2006-092503 A | 4/2006 |

* cited by examiner

*Primary Examiner* — Debbie Le
*Assistant Examiner* — Anh Tai Tran

(57) ABSTRACT

Provided is a mechanism wherein key-value structure data are effectively combined, and dynamic changes in the data structure and amount of data are coped with flexibly; and wherein the throughput in frequent reading of simple tables is improved with this mechanism. A flexible data model is built, by making a referring mechanism for referring to attributes, and a referred-to mechanism wherein references to attributes are made, to be a "referring—-referring" element and a "referred-to—-referred-to" element; making a component by sandwiching key-value-store structure data; and combining components having multiple attributes with each other, as a "referring—referred-to" relationship. Furthermore, receiving search results as a key-value-store structure cache will contribute in simplifying accesses by conventional application programs to the aforementioned flexible data model, which by extension will contribute in making the whole application program more high-speed.

5 Claims, 9 Drawing Sheets

--Prior Art--

--Prior Art--

ATTRIBUTED KEY-VALUE-STORE DATABASE SYSTEM

FIELD OF INVENTION

This invention relates to the database system which used the key value store with an attribute, and it.

BACKGROUND OF THE INVENTION

Key value store as usual like one described in drawing 1 and non-patent document 1, was merely a database resource as a simple collection of key value elements, which is a combination of values and keys (ID) which identify the values. It is utilized in WEB sites which gather text information on a global scale over the Internet and store it as key value type data, in order to search text with criteria "containing text" while it also is utilized in Electric Commerce WEB sites which keep data of the world's books and inventory search upon customers' request within WEB sites. In most sites, they utilize recorded text data as a value and find the key value data that holds text data as a portion which matches the search key within to make a list of keys that match the key value data, so that they assort on user demands and display by re-keying database resources in the key list This key value store, as shown in drawing 1, because of its simplicity, is easy for horizontal partitioning of database resources, and can have an excellent feature if we use it to disperse partitioned database resource to relatively huge numbers of small server computers and treated them as one giant search-wise database system.

It is indicated in the non patent document 1 how in horizontal partitioning of the database resource which comprises key value type data that uses a lot of unique ID as a key, the method on computer servers in order to store and manage database resources above divides into a physical-database group using a hash function etc., meeting the storage capacity of the server computer for storing, and the technique of arranging said database resource directly in order the server calculation on a plane which carries out storing management.

However, either when the server computers which carry out storing management of said database resource need to be reduced by means of such failure during operation, or when the server computer which carries out storing management of said database resource by means of such scale expansion etc., many database resources must be made moved. The method of minimizing movement of a database resource is indicated in the patent document 2 that; instead of using a hash function etc., when dividing to meet the storage capacity of the server computer for storing, said database resource is divided into the logical database group of about ¹⁄₁₀ size from the third of the storage capacity of the server computer which carries out storing management, so that; a table to which the server computer group which carries out storing management of said one or more logical database group groups and said one or more database resources is made to correspond is utilized to arrange.

The distributed database dispersed and arranged at the large scale database or the physically distant place, by dividing into two or more domains, having one or more database management systems in the topology server in each domain, and exchanging the meta information between each topology servers, the distributed database system with the real time update performance in practical use as well as data consistency by exclusive control or reference nature consistency is indicated in the patent document 1.

Said meta information is not exchanged for each meta information, instead the partition cash art of sharing main memory unit space between topology servers through/or the replication cash technology which reproduces and has main memory unit space between topology servers are used, the method of attaining highly efficiency of a distributed database system with the real time update performance in practical use as well as consistency is indicated in the patent documents 3. In multi-transaction processing in these patent documents 3, besides collateral data consistency by exclusive control or reference nature consistency, do the counter rise of by an update request, and the counter down of is done by updating success, the table to which the server computer group which carries out storing management of a counter, and said logical database groups' group and said database resource for judging the time of returning to zero that the update of the whole transaction was successful is made to correspond, how to realize by distribution-sharing or duplicate sharing between the topology servers of each domain is also indicated.

When the mainstream of the database changes from the network-type database to the relational database, in early the 1980s, The badness of the throughput by the low level of the performance of a relational database, especially the performance of JOIN processing had become a problem with the poor access speed and capacity of the low level of the CPU performance of the computer for carrying out management storing of the database of those days, and a main memory unit and a secondary memory. In order to avoid the problem, there were the time when it was allowed to be said that it is better not to normalize, on the other hand, they are remnants of the architecture of a network-type database as the avoiding means, perform a bonding process beforehand at the time of ROW(row, a tuple, or a record) insertion through/or updating, and the location information by a pointer is held, when a actual bonding process was required, the technique named "pre-joining" in the meaning of "combining of forecast" that the location information by the pointer performs a bonding process at high speed was used by some relational databases. The structure is indicated in drawing 2. There shall be the refer passive table (relation) 10 and refer positive table 20, where table 10 has the COLUMN (columns, an attribute, or the field) 11 and 12, and the primary key is attached to the column 11, so that each record of the table 10 has unique key. In addition, the refer active table 20 shall also have the column 21 and the column 22, and the external reference key (FOREIGN KEY) shall be set to the column 11 at the column 22. There is the special column 15 which stores row ID of the record in the refer active table 20 currently referred to at the special column 14 and the last which store line ID of the record in the refer active table 20 which is referring to the record with the refer passive table 10 first, and while there is the special column 26 which stores row ID of the record in the refer active table 20 which is referring to the record concerned of the special column 25 which stores row ID of the record in the refer active table 20 which is referring to the record concerned of the refer passive table 10 previously, and the refer passive table 10 behind, where it is possible for the collection set of the record in the refer active table 20 which refers to the record concerned of the refer passive table 10 to come to hand. Moreover, the special column 16 for the convenience which stores the number of the record in the refer active table 20 specified as the element of this collection set is shown in the refer passive table 10, and the special column 24 which stores row ID of the record in the refer passive table of a reference destination is shown in the reference table 20. This structure has made the relations between refer active and refer passive tables can be held flexibly and can acquire at high speed as well as "pre joining" enabled.

DESCRIPTION OF THE PRIOR ART

Japan Patent No. 4158534 (U.S. patent application Ser. No. 10/542,967) entitled 'Distributed Database System' disclosed on Aug. 12, 2004 and patented on Jul. 25, 2008 by JPO and filed on Mar. 6, 2006 by USPTO (henceforth Patent Referenced Document 1).

Japan Patent No. 4313845 disclosed on Apr. 6, 2006 and patented on May 22, 2009 by JPO entitled 'Multi Instance the in-memory Database' (henceforth Patent Referenced Document 2).

Japan Patent No. 4362839 (U.S. patent application Ser. No. 12/778,124) entitled 'Multi Instance the in-memory Database' disclosed on Nov. 11, 2009 and patented on Aug. 28, 2009 by JPO (henceforth Patent Referenced Document 3).

'Technology of Scale Out', UNIX Magazine, April 2009 (quarterly) ASCII MEDIA WORKS (Japan) p. 78-91 (henceforth Non-Patent Referenced Document 1)

SUMMARY OF THE INVENTION

Key value store technology is simple yet utilized as scale out technology in the system being large-sized, such as a global character-string-search site and the Internet shops of rare books. However, contrary to the ease of the scale out on account of the key value data structural simplicity, they are hardly utilized build the more advanced and complicated system required to correspond to a dynamic change of a data structure and data volume flexibly by combining them effectively to employ the simplicity efficiently.

Thus, it is subject of this invention to provide the means for applying key value store technology to the system required to be flexible and to correspond with performance in use to a dynamic change of a data structure and data volume although it is more advanced and complicated.

METHODS TO RESOLVE ISSUES

It carries out "adding a referenced mechanism for being referred to as a reference mechanism and an attribute for referring to an attribute" of this invention to key value structural data given in drawing 1, Another key value structural data by which "adding a referenced mechanism for being referred to as a reference mechanism and an attribute for referring to an attribute" was carried out, Make it refer to it as the attribute, and from another key value structural data by which "adding a -ed reference mechanism for being referred to as a reference mechanism and an attribute for referring to an attribute" was carried out. Subject is solved with the cell object component device of a description to drawing 6 which provides structure of being referred to as the attribute.

A mechanism in which two or more tuples on two or more another relation are referring to a single tuple like a pre-join mechanism in a relational database shown in drawing 2, It is the refer active/passive dual type cell object element apparatus 100 given in drawing 3 which was applied to carrying out "adding a refer passive mechanism for being referred to as a refer active mechanism and an attribute for referring to an attribute" while key value structural data remains as main factor. The refer active/passive dual type cell object element apparatus 100 comprises the reference cell object component enclosure apparatus 130 which is a refer passive mechanism for being referred to with the refer active cell object component enclosure 120 which is a refer active mechanism for referring to the cell object storage 110 and an attribute which are key value structural data. Further, drawing 6 and the cell object component device according to claim 1 are constituted, and issue is resolved by this.

The cell object component device according to claim 1 which applied the refer active/passive dual-type type cell object element device 100 is explained using FIG. 3.

Cell object component apparatus/apparatuses 400 which being stationed in the main memory of a set of the computer which having at least a CPU and a main memory module wherein having one or more refer active/passive dual-type cell object element apparatus/apparatuses 100, said characterized in followings:

herein said refer active/passive dual-type cell object element apparatus/apparatuses 100, wherein having;

one or more cell object element identifier storage unit 111 for storing cell object element identifiers which identifying said refer active/passive dual-type cell object element apparatus/apparatuses 100, one or more cell object element value storage unit 112 for storing any value in said refer active/passive dual-type cell object element apparatus/apparatuses 100, refer passive cell object component information storage apparatus 120 for storing information of the one or more said cell object component apparatus/apparatuses 400 that being referred by the other said cell object component apparatus/apparatuses 400, and, refer active cell object component information storage apparatus/apparatuses 130 for storing information of the one or more said cell object component apparatus/apparatuses 400 that referring to the other said cell object component apparatus/apparatuses 400, herein said refer active cell object component information storage apparatus 120, wherein having at least;

cell object component identifier storage unit 121 for storing cell object component identifier of the other said cell object component apparatus/apparatuses 400 which the said cell object component apparatus/apparatuses 400 referring to, previous refer active cell object component identifier storage unit 122 for storing said cell object component identifiers of the said cell object component apparatus 400 which refers to the other said cell object component apparatus 400 which is referred by the other said cell object component apparatus 400 last before, and, next refer active cell object component identifier storage unit 123 for storing said cell object component identifiers of said cell object component apparatus 400 which refers to the other said cell object component apparatus 400 which is referred by the other said cell object component apparatus 400 first after, herein said refer passive cell object component information storage apparatus/apparatuses 130, wherein having at least;

first refer active cell object component identifier storage unit 131 for storing said cell object component identifiers of said cell object component apparatus 400 which refers to the other said cell object component apparatus 400 first, and, end refer active cell object component identifier storage unit 132 for storing cell object component identifiers of said cell object component apparatus 400 which refers to the other said cell object component apparatus 400 last.

However, although it can be referred to from two or more references origin in the cell object component device according to claim 1, Since two or more attributes cannot be referred to, in order to solve this, The referenced type cell object element device 200 of a description and the referred to type cell object element device 300 given in FIG. 5 are connected to FIG. 4, FIG. 6 which can refer to two or more attributes, and the cell object component device 400 according to claim 2 are constituted, and issue is resolved by this.

The cell object component device according to claim 2 is explained using FIG. 4, FIG. 5, and FIG. 6.

The referenced type cell object element device 201 given in FIG. 6 here is an instance of the referenced type cell object element device 200 given in FIG. 4. The reference cell object component information storage apparatus/apparatuses 220 and 230, the cell object element identifier storage 211, the cell object element-value storage 212, and the head reference cell object component identifier storages 221 and 231, And the end reference cell object component identifier storages 222 and 232 are indicated to FIG. 4.

The referred to type cell object element device 301 given in FIG. 6 here thru/or 300+n (by this paragraph, n is taken as one or more integers below) are the instances of the referred to type cell object element device 300 given in FIG. 5. The reference cell object component information storage apparatus/apparatuses 320 and 330, the just before reference cell object component identifier storages 322 and 332, and the immediately after reference cell object component identifier storages 323 and 333 are indicated to FIG. 5.

Cell object component apparatus/apparatuses 400 which being stationed in the main memory of a set of the computer which having at least a CPU and a main memory module wherein having the instance 301 thru/or 300+n of the one or more said refer active cell object element apparatus/apparatuses 300 and the instance 201 of the one or more said refer passive cell object element apparatus/apparatuses 200, said cell object component apparatus/apparatuses 400 characterized in followings:

herein the instance 301 thru/or 300+n of the said refer active cell object element apparatus/apparatuses 300, wherein having;

one or more cell object element identifier storage unit 311 for storing cell object element identifiers which identifying the instance 301 thru/or 300+n of the said refer active cell object element apparatus/apparatuses 300, one or more cell object element value storage unit 312 for storing any value in the instance 301 thru/or 300+n of the said refer active cell object element apparatus/apparatuses 300, and, refer active cell object component information storage apparatus/apparatuses 320 and 330 for storing information of the one or more said cell object component apparatus/apparatuses 400 that referring to said the cell object component apparatus/apparatuses 400, herein the instance 201 of the said refer passive cell object element apparatus/apparatuses 200, wherein having;

one or more cell object element identifier storage unit 211 for storing cell object element identifiers which identifying the instance 201 of the said refer passive cell object element apparatus/apparatuses 200, one or more cell object element value storage unit 212 for storing any value in the instance 201 of the said refer passive cell object element apparatus/apparatuses 200, and, refer passive cell object component information storage apparatus/apparatuses 220 and 230 for storing information of one or more said cell object component apparatus/apparatuses 400 that being referred by the other said cell object component apparatus/apparatuses 400, herein said refer active cell object component information storage apparatus 320 and 330, wherein having at least;

cell object component identifier storage unit 321 and 331 for storing cell object component identifier of the other said cell object component apparatus/apparatuses 400 which the said cell object component apparatus/apparatuses 400 referring to, previous refer active cell object component identifier storage unit 322 and 332 for storing said cell object component identifiers of the said cell object component apparatus 400 which refers to the other said cell object component apparatus 400 which is referred by the other said cell object component apparatus 400 last before, and, next refer active cell object component identifier storage unit 323 and 333 for storing said cell object component identifiers of said cell object component apparatus 400 which refers to the other said cell object component apparatus 400 which is referred by the other said cell object component apparatus 400 first after, herein said refer passive cell object component information storage apparatus/apparatuses 220 and 230, wherein having at least;

first refer active cell object component identifier storage unit 221 and 231 for storing said cell object component identifiers of said cell object component apparatus 400 which refers to the other said cell object component apparatus 400 first, and, end refer active cell object component identifier storage unit 222 and 232 or storing cell object component identifiers of said cell object component apparatus 400 which refers to the other said cell object component apparatus 400 last.

the in-memory object oriented database system according to claim 3 which applied the cell object component device 400 is explained using FIG. 3, FIG. 4, FIG. 5, FIG. 6, and FIG. 7.

Here, The refer active/passive dual-type type cell object element device 100. And the cell object element identifier storage 111, the cell object element-value storage 112, the reference cell object component information storage apparatus/apparatuses 120, and the reference cell object component information storage apparatus/apparatuses 130 are indicated to FIG. 3.

The instance 201 of a referenced type cell object element device given in FIG. 6 here is an instance of the referenced type cell object element device 200 given in FIG. 4. The reference cell object component information storage apparatus/apparatuses 220 and 230, the cell object element identifier storage 211, the cell object element-value storage 212, and the head reference cell object component identifier storages 221 and 231, And the end reference cell object component identifier storages 222 and 232 are indicated to FIG. 4.

The instance 301 of refer passive cell object element apparatus/apparatuses given in FIG. 6 here thru/or 300+n (by this paragraph, n is taken as one or more integers below) are the instances of the referred to type cell object element device 300 given in FIG. 5. The reference cell object component information storage apparatus/apparatuses 320 and 330, the just before reference cell object component identifier storages 322 and 332, and the immediately after reference cell object component identifier storages 323 and 333 are indicated to FIG. 5.

Here, the instances 4500 thru/or 4535 of the said cell object component apparatus/apparatuses 400 are instances of the cell object component device 400 given in FIG. 6.

the in-memory object-oriented database system 500 which being stationed in the main memory of a set of the computer which having at least a CPU and a main memory module, the in-memory object-oriented database system characterized in followings:

herein the in-memory object-oriented database system comprises combination the instances 4500 thru/or 4535 of the said cell object component apparatus/apparatuses 400, wherein the instances 4500 thru/or 4535 of the said cell object component apparatus/apparatuses 400 having one of;

one or more refer active/passive dual-type cell object element apparatus/apparatuses 100, the instance 301 thru/or 300+n of the one or more said refer active cell object element apparatus/apparatuses 300 and the instance 201 of one or more said refer passive cell object element apparatus/apparatuses 200, one or more refer active/passive dual-type cell object element apparatus/apparatuses 100 and the instance 301 thru/or 300+n of the one or more said refer active cell object element apparatus/apparatuses 300, one or more refer active/passive dual-type cell object element apparatus/apparatuses 100 and the instance 201 of one or more said refer passive cell object element apparatus/apparatuses 200, and, one or more refer active/passive dual-type cell object element apparatus/apparatuses 100 and the instance 301 thru/or 300+n of the one or more said refer active cell object element apparatus/apparatuses 300 and the instance 201 of one or more said refer passive cell object element apparatus/apparatuses 200, said refer active/passive dual-type cell object element component apparatus 100 having;

one or more cell object element identifier storage unit 111 for storing cell object element identifiers which identifying said refer active/passive dual-type cell object element apparatus/apparatuses 100, one or more cell object element value storage unit 112 for storing any value in the said refer active/passive dual-type cell object element apparatus, refer passive cell object component information storage apparatus 120 for storing information of itself or other the instances 4500 thru/or 4535 of the one or more said cell object component apparatus/apparatuses 400 which being referred by the instances 4500 thru/or 4535 of the said cell object component apparatus/apparatuses 400 referring, and, refer active cell object component information storage apparatus 130 for storing information of itself or other the instances 4500 thru/or 4535 of the one or more said cell object component apparatus/apparatuses 400 which referring to the instances 4500 thru/or 4535 of the said cell object component apparatus/apparatuses 400, said the instance 301 thru/or 300+n of the said refer active cell object element apparatus/apparatuses 300 having;

one or more cell object element identifier storage unit 211 for storing cell object element identifiers which identifying the instance 301 thru/or 300+n of the said refer active cell object element apparatus/apparatuses 300, one or more cell object element value storage unit 212 for storing any value in the instance 301 thru/or 300+n of the said refer active cell object element apparatus/apparatuses 300, and, refer active cell object component information storage apparatus for storing information of itself or other the instances 4500 thru/or 4535 of the one or more cell object component apparatus/apparatuses 400 which being referred by the instances 4500 thru/or 4535 of the said cell object component apparatus/apparatuses 400, the instance 201 of said refer passive cell object element apparatus/apparatuses 200 having;

one or more cell object element identifier storage unit 211 for storing cell object element identifiers which identifying the instance 201 of said refer passive cell object element apparatus/apparatuses 200, one or more cell object element value storage unit 212 for storing any value of the instance 201 of said refer passive cell object element apparatus/apparatuses 200, and, refer passive cell object component information storage apparatus for storing information of itself or said other the instances 4500 thru/or 4535 of the one or more cell object component apparatus/apparatuses 400 which referring to the instances 4500 thru/or 4535 of the said cell object component apparatus/apparatuses 400, herein said refer active cell object component information storage apparatus, wherein having at least;

cell object component identifier storage unit for storing cell object component identifier of other the instances 4500 thru/or 4535 of the said cell object component apparatus/apparatuses 400 which the instances 4500 thru/or 4535 of the said cell object component apparatus/apparatuses 400 referring to, previous refer active cell object component identifier storage unit for storing said cell object component identifiers of the said cell object component apparatus 400 which refers to the instances 4500 thru/or 4535 of the other said cell object component apparatus 400 which is referred by the other instances 4500 thru/or 4535 of the said cell object component apparatus 400 last before, and, next refer active cell object component identifier storage unit for storing said cell object component identifiers of the instances 4500 thru/or 4535 of the said cell object component apparatus 400 which refers to the other instances 4500 thru/or 4535 of the said cell object component apparatus 400 which is referred by the other instances 4500 thru/or 4535 of the said cell object component apparatus 400 first after, herein said refer passive cell object component information storage apparatus/apparatuses, wherein having at least;

first refer active cell object component identifier storage unit for storing said cell object component identifiers of the instances 4500 thru/or 4535 of the said cell object component apparatus 400 which refers to the other instances 4500 thru/or 4535 of the said cell object component apparatus 400 first, and, end refer active cell object component identifier storage unit for storing cell object component identifiers of the instances 4500 thru/or 4535 of the said cell object component apparatus 400 which refers to the other instances 4500 thru/or 4535 of the said cell object component apparatus 400 last.

The in-memory relational database system 600 according to claim 4 which applied a cell object component apparatus/apparatuses 400 is explained using FIG. 8.

Here, the instances 4600 thru/or 4633 of the cell object component apparatus/apparatuses are instances of the cell object component apparatus/apparatuses 400 given in FIG. 6.

The in-memory relational database system 600 which being stationed in the main memory of a set of the computer which having at least a CPU and a main memory module, the in-memory relational database system 600 characterized in followings:

the in-memory relational database system 600 having;

the instances 4600 thru/or 4633 of the one or more cell object component apparatus/apparatuses 400 described in claim 3 for managing database, to which the in-memory object-oriented database system 500 described in claim 3 comprising, the instance 4602 of the one or more cell object component apparatus/apparatuses 4600 described in claim 3 for managing data type set, to which the in-memory object-oriented database system 500 described in claim 3 comprising, the instances 4612 thru/or 4613 of the one or more cell object component apparatus/apparatuses 400 described in claim 3 for managing data type which referring to the instance 4602 of the said cell object component apparatus/apparatuses 400 respectively for managing said data type set, the instance 4601 of the one or more cell object component apparatus/apparatuses 400 described in claim 3 for managing the relation/relations which referring to the instance 4600 of the said cell object component apparatus/apparatuses 400 respectively for managing said database, the instances 4611 of the cell object component apparatus 400 described in claim 3 for managing a group of attributes in two or more the other the instances 4610 thru/or 4611 of the said cell object component apparatuses 400 which referring to the instance 4601 of the cell object component apparatus/apparatuses 400 respectively described in claim 3 for managing said the relation/relations, the instances 4610 of the cell object component apparatus 400 described in claim 3 for managing a group of tuple ID in two or more the other the instances 4610 thru/or 4611 of the said cell object component apparatuses 400 which referring to the instance 4601 of the cell object component apparatus/apparatuses 400 respectively described in claim 3 for managing said the relation/relations, the instances 4612 thru/or 4613 of the one or more cell object component apparatus/apparatuses 400 described in claim 3 for managing said attributes which referring to the instance s 4622 thru/or 4623 of the cell object component apparatus/apparatuses 400 to manage both said group of attributes and said data type respectively, and further more to store length of each data corresponding to each attribute for managing said group of attributes and which said a group of attributes comprising to, the instances 4620 thru/or 4621 of the one or more cell object component apparatus/apparatuses 400 described in claim 3 for managing one or more tuple ID/IDs which referring to the instance 4610 of the cell object component apparatus/apparatuses 400 respectively for managing said a group of tuple IDs, and, the instances 4620 thru/or 4621 of the one or more cell object component apparatus/apparatuses 400 described in claim 3 for managing one or more cell/cells which referring to both the instances 4622 thru/or 4623 of the cell object component apparatus/apparatuses 400 respectively for managing said attributes and the instances 4630 thru/or 4633 of the cell object component apparatus/apparatuses 400 respectively for managing said tuple IDs.

The in-memory XML database system 700 according to claim 5 which applied the cell object component apparatus/apparatuses is explained using FIG. 9.

The in-memory object-oriented database system 500 which being stationed in the main memory of a set of the computer which having at least a CPU and a main memory module, the in-memory XML database system 700 characterized in followings:

the in-memory XML database system 700 having;

the instance 4701 of one or more cell object component apparatus/apparatuses 400 described in claim 3 for managing database, to which the in-memory object-oriented database system 500 described in claim 3 comprising, the instance 4701 of one or more cell object component apparatus/apparatuses 400 described in claim 3 for managing the location of tag list to which the in-memory object-oriented database system described in claim 3 comprising, the instances 4711 thru/or 4712 of the one or more cell object component apparatus/apparatuses 400 described in claim 3 for managing the tag list which referring to the instance 4701 of the cell object component apparatus/apparatuses 400 respectively for managing the said location of tag list, the instances 4700, 4710, 4720, 4730, and 4731—of the one or more cell object component apparatus/apparatuses 400 described in claim 3 for managing control elements of tags which referring to the instance 4711 of the cell object component apparatus/apparatuses 400 respectively for managing said tag list, and, the instances 4713, 4721, 4722, 4733, and 4734—of the one or more cell object component apparatus/apparatuses 400 described in claim 3 for storing value of data which referring to the instance 4712 of the cell object component apparatus/apparatuses 400 respectively for managing said control elements of tags, herein the instances 4700, 4710, 4713, 4720, 4721, 4722, 4730 to 4735 of the said cell object component apparatus/apparatuses 400 for managing said control elements of tags is/are referred by the instances 4700, 4710, 4713, 4720, 4721, 4722, 4730 to 4735 of the cell object component apparatus/apparatuses 400 to manage one or more other said control elements of tags or the instances 4700, 4710, 4713, 4720, 4721, 4722, 4730 to 4735 of the cell object component apparatus/apparatuses 400 to store one or more said value of data recursively.

EFFECTS OF THE INVENTION

Encapsulation is done while making the best use of the merit of simplicity of a key value structural data. Those capsules are sparse united. As a result, even if it is demanded to correspond to a dynamic change in the data structure and volume of data flexibly, it becomes possible to construct and to be operated without being lost in an advanced, complex large system the practical performance.

The cell object component device is cell object component information 221 (It is location substantially informational) that refers to the cell object component described in cell object component information (It is location substantially informational) 121 or FIG. 4 the reference described in FIG. 3 ahead first. IP address of the node the reference ahead and location information on the MAC address etc. may be included in cell object component information 321, 331 (It is location substantially informational) the reference described in cell object component information (It is location substantially informational) 222, 232 or FIG. 5 where 231 or own cell object component is referred at the end ahead. This cell object component device is described in FIG. 6 where the said Key-value-store data to which the mechanism because of the reference as the attribute of the reference mechanism, 1 or more to refer to the attribute of 1 or more to be referred was added is shown. Therefore, it means be to be able to go on other nodes to refer in the attribute, and this to be able to divide the data base object group vertically exceeding the node. The aspect etc. are done to the relation of relational database (Or, table), and the vertical partitioning means division in the direction of the attribute (Or, column), that is, projection (Or, projection) with the data base object group here in the application to relational database described in FIG. 8 for instance.

Moreover, it is cell object component informational that does 122 or referring cell object component information immediately before doing referring described in FIG. 3 ahead similarly (It is location substantially informational) ahead similarly (It is location substantially informational) 123. IP address of the node the reference ahead and location information on the MAC address etc. may be included in cell object component information 323 or 333 (It is location substantially informational) that does 322 or 332 or referring cell object component information immediately before doing referring described in FIG. 5 ahead similarly (It is location substantially informational) ahead similarly. Therefore, the tuples with the same attribute can be arranged also on other nodes. It means this is to be able to divide the data base object group horizontally exceeding the node. The aspect etc. are done to the relation of relational database (Or, table), and the horizontal decomposition means division in the direction of the tuples (Or, row), that is, the selection with the data base object group here in the application to relational database described in FIG. 8 for instance.

What level division of the relation (or table) which comprises a lot of tuples (or low) in a multi-instance the in-memory database given in the patent documents 2 is applied to this invention for, Division which straddles a database object group's node which comprises a lot of database objects of the in-memory object oriented database which is a generalized type of a relational database is also enabled.

Also in the XML database which is a specialized type different from the relational database of an the in-memory object oriented database, The division which straddles a database object group's node which comprises a database object surrounded by a lot of specific tags is possible.

By applying here the art which is repository-ized and is exchanged by making database status information given in the patent documents 1 and the patent documents 3 etc. into topology information, the peer to peer type distributed object inclination database system in which renewal of the real time is possible—and, The peer to peer type distribution relational database in which renewal of the real time is possible and the peer to peer type distribution XML database in which renewal of the real time is possible which are the specialized type can be carried out now.

DETAILED DESCRIPTION OF THE PREFERRED EMBODIMENTS

The embodiment of the present invention is explained below using drawings. The present invention is not limited to this embodiment, and can be embodied in a variety of forms within a range that does not deviate from the gist.

Figure 1:
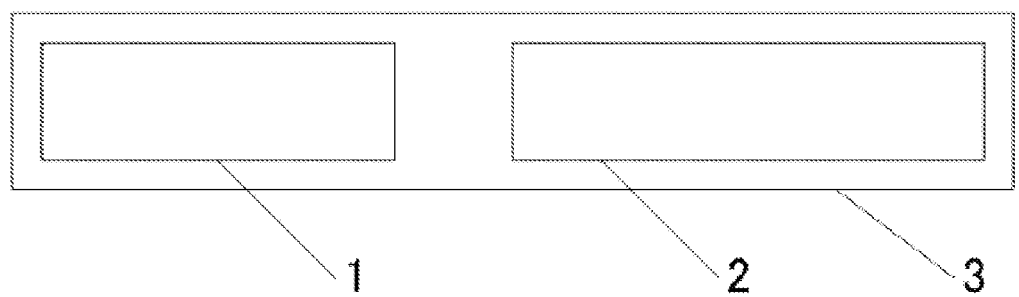
FIG. 1 is structural drawing showing the key value model data structure of a description in the non-patent document 1.
Figure 2:
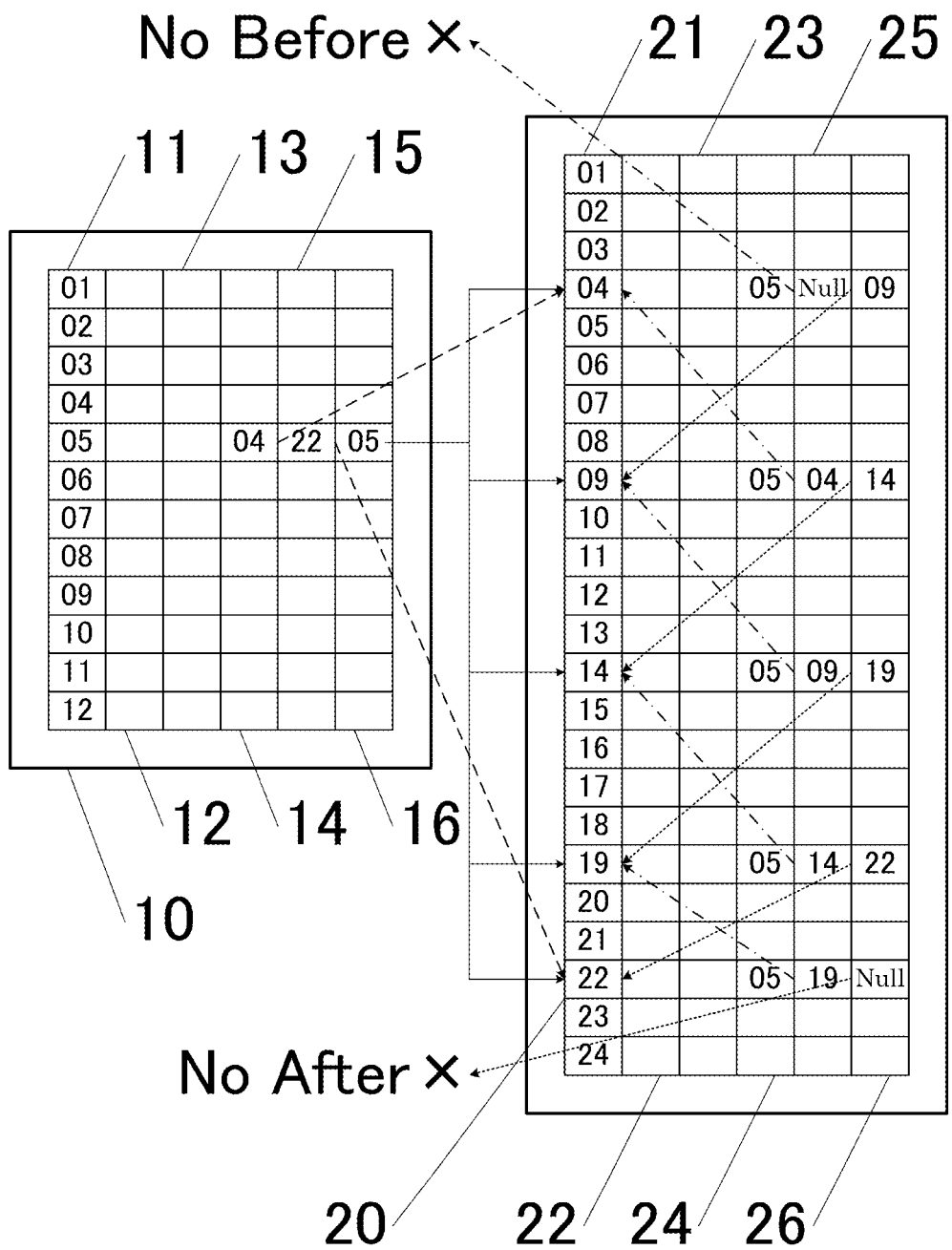
FIG. 2 is structural drawing showing the pre joining mechanism in a relational database.
Figure 3:
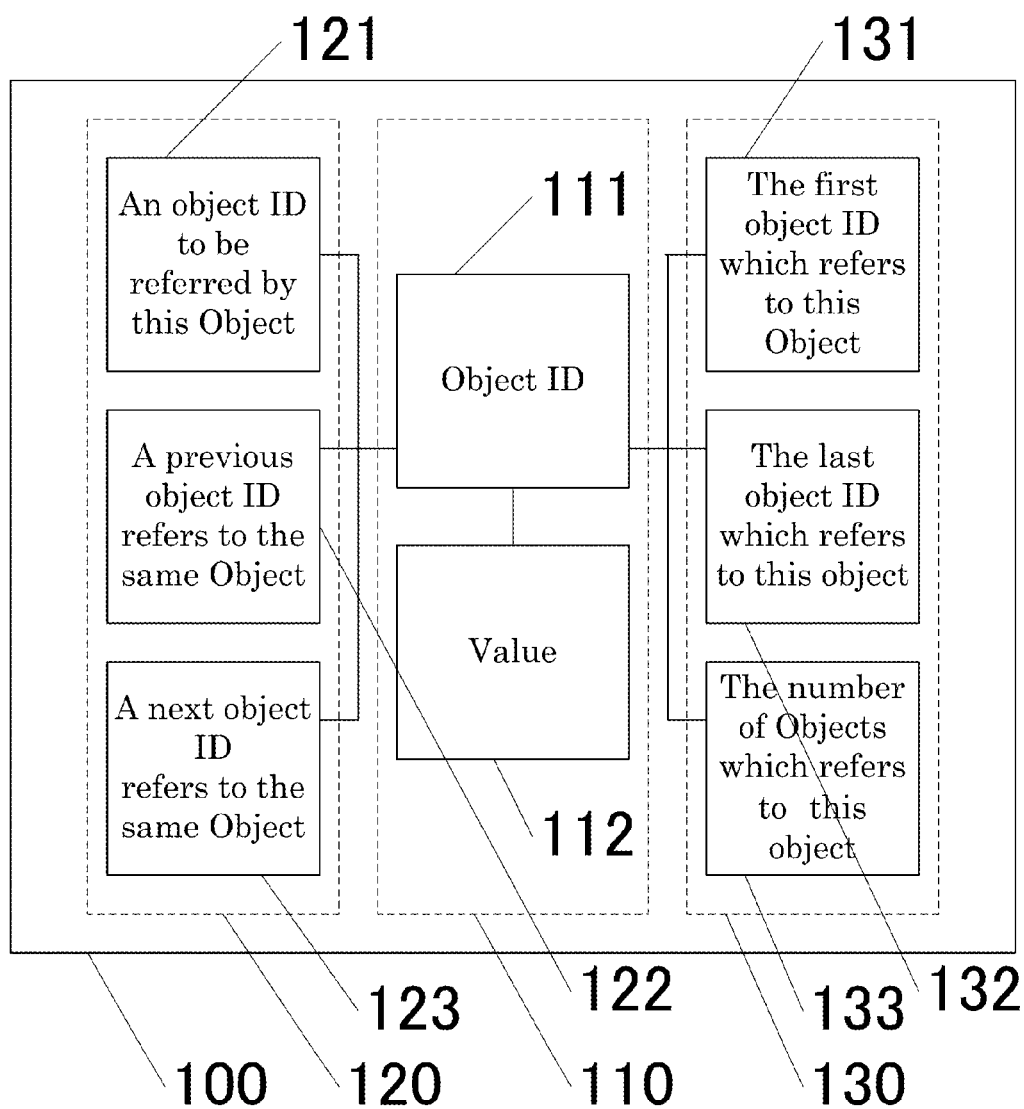
FIG. 3 is structural drawing of the refer active/passive dual-type type cell object element apparatus/apparatuses which applied the pre joining mechanism to key value model data structure.
Figure 4:
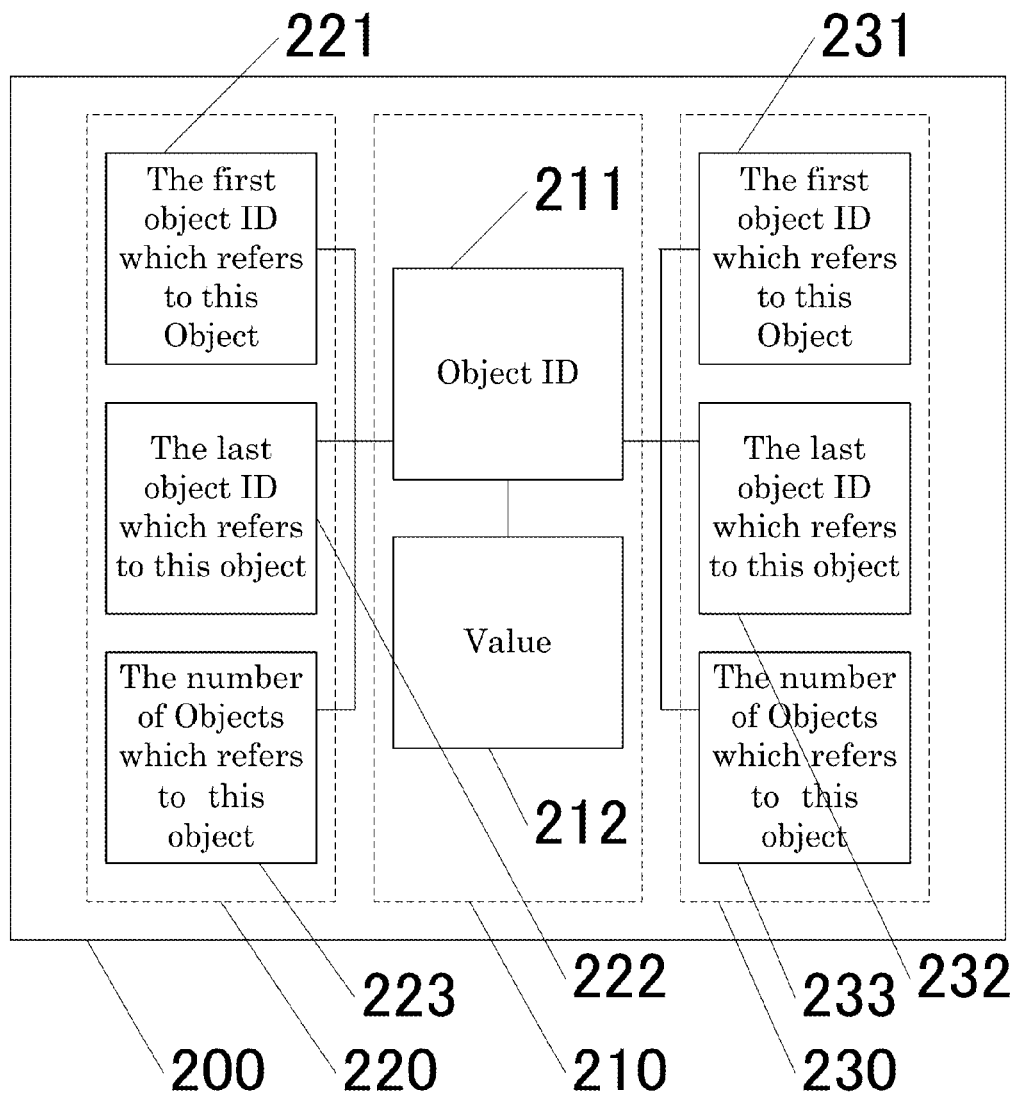
FIG. 4 is structural drawing of the referenced type cell object element device which specialized the interface between elements of the both sides of a reference-referenced two-ways type cell object element apparatus/apparatuses in the referenced type.
Figure 5:
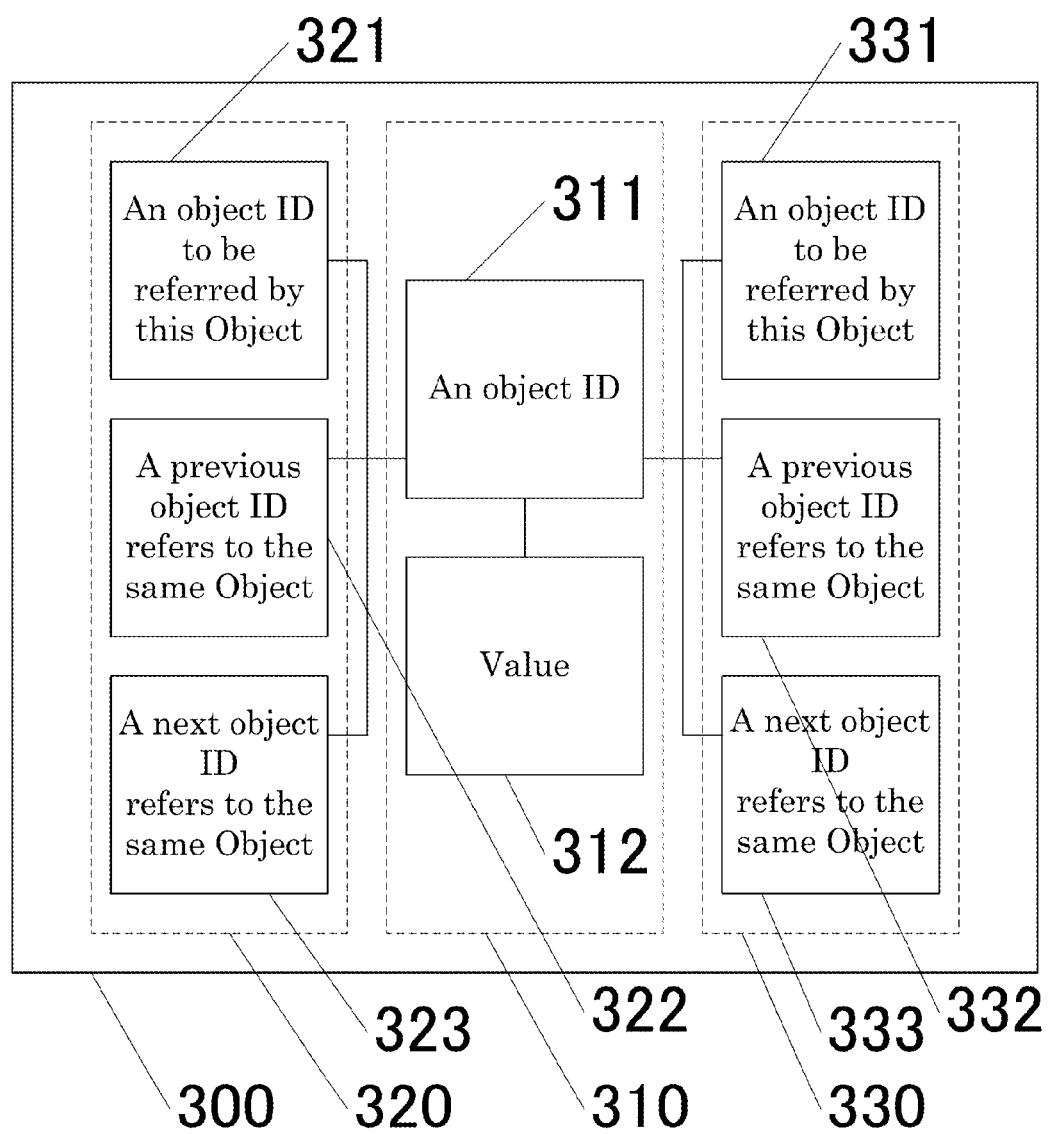
FIG. 5 is structural drawing of the referred to type cell object element apparatus/apparatuses which specialized the interface between elements of the both sides of a reference-referenced two-ways type cell object element apparatus/apparatuses in the referred to type.
Figure 6:
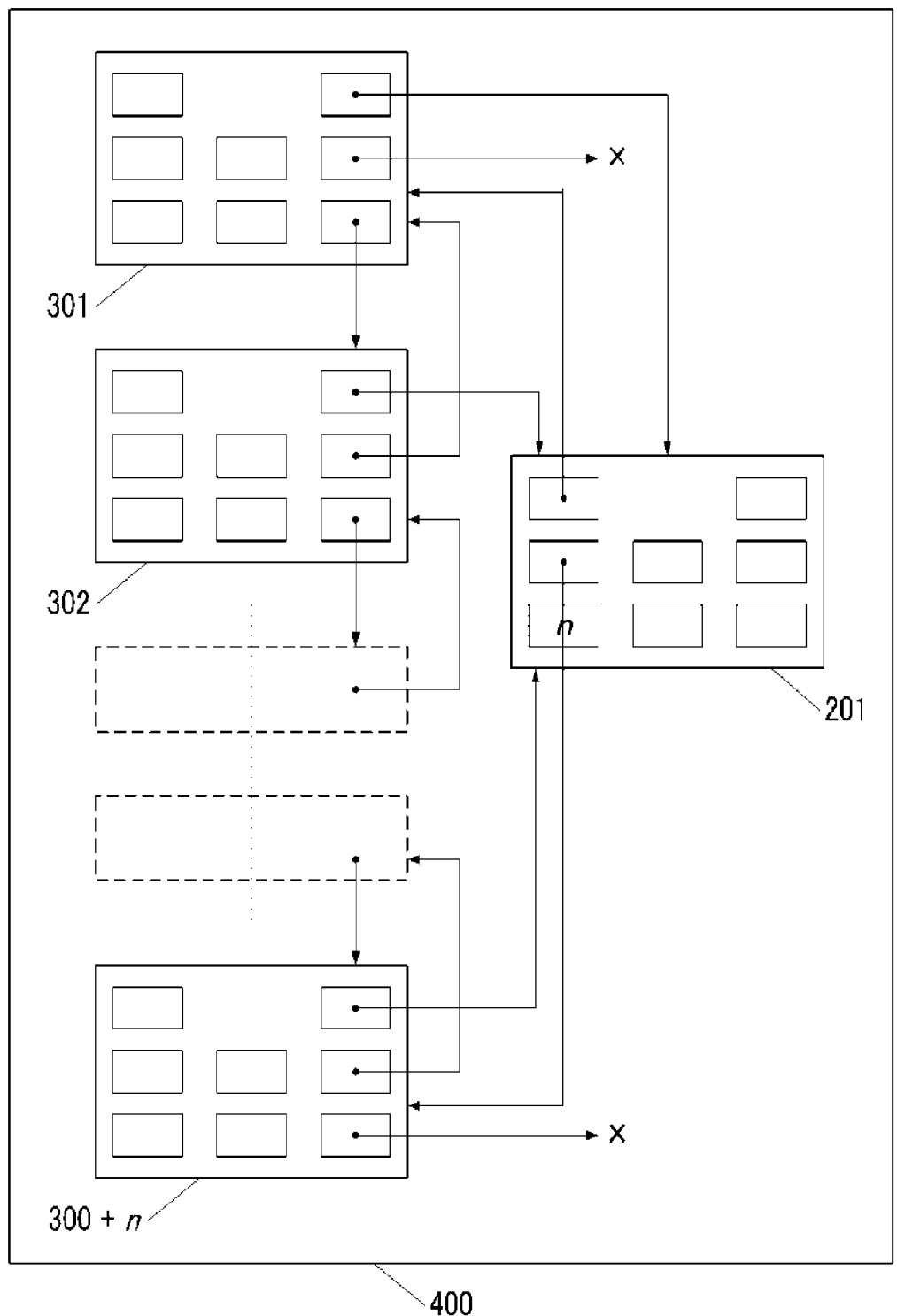
FIG. 6 is structural drawing of the cell object component apparatus/apparatuses which can refer to 1 constituted combining the referred to type cell object element device and the referenced type cell object element device, two or more selves, or other components.

Embodiment 1: The embodiment of the in-memory object oriented database system 500 according to claim 3 by the combination of the said cell object component apparatus/apparatuses 400 (following component) given in FIG. 6 is indicated to FIG. 7. There is an applicant of one or more in the patent to which the patent is assessed, and assumed to be a claim of one or more. It is necessary to be done the possession list making and to register the identification number to each applicant.

Figure 7:
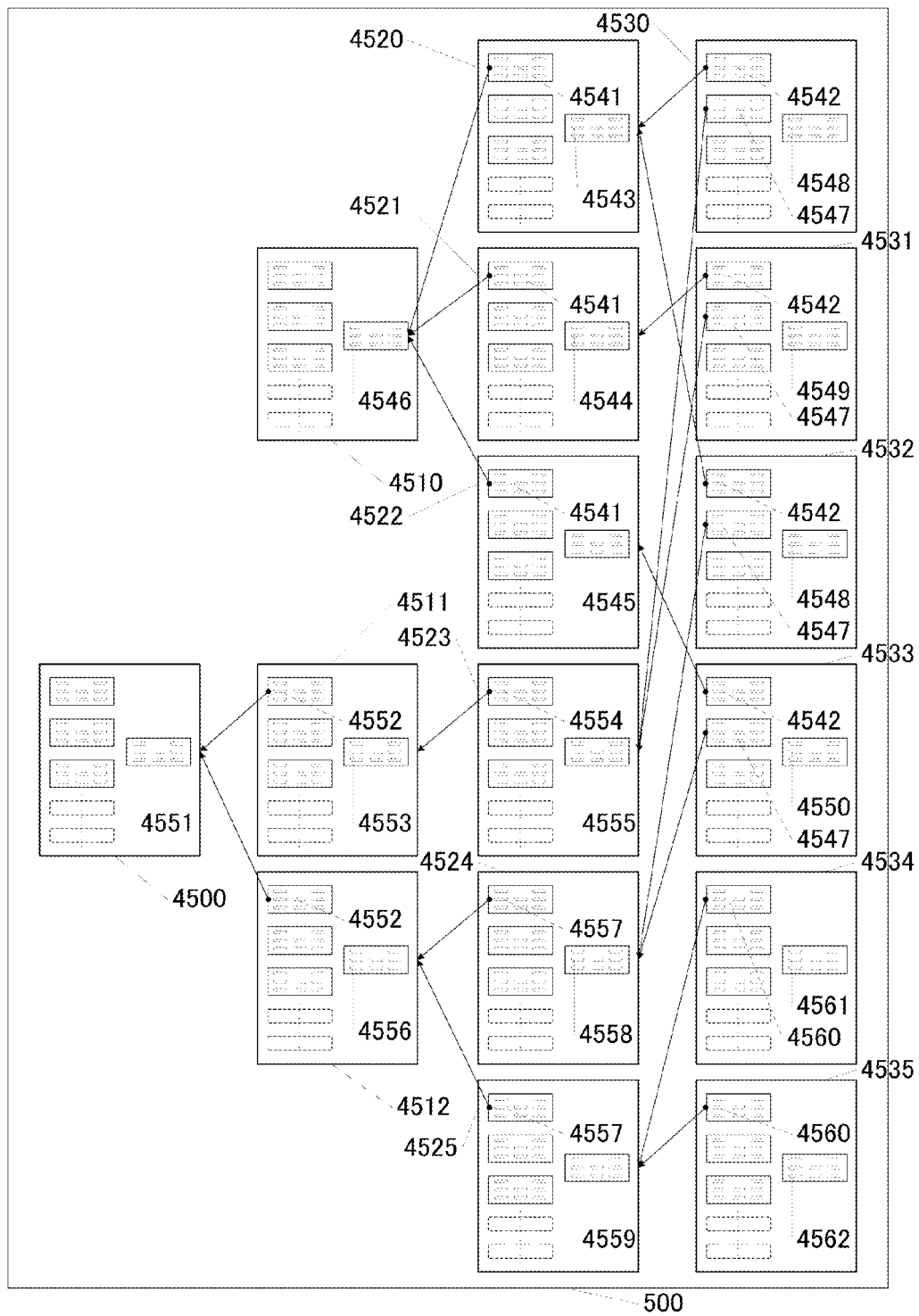
FIG. 7 is an example of composition of the in-memory object oriented database by the combination of the said cell object component apparatus/apparatuses 400 (Embodiment 1).

In FIG. 7, 4530,4531,4532,4533 is a component according to the applicant who has patent applicant ID as value. Each the component has the person attribute to be identified and the applicant attribute. Person A component 4520 to be identified, person B component 4521 to be identified, and person C component 4522 to be identified have the those who identify it number attribute respectively and refer to identification number list component 4510. More over the applicant attribute of applicant A1 component 4530 and applicant B1 component 4531 refer to both applicant the 4158634th patents list components 4523 and the applicant attribute of applicant A2 component 4532 and applicant C1 component 4533 refer to both applicant the 4313845th patents list components 4524. 4534,4535 is a component with claim ID as value, and each the component has the claim list attribute. Moreover, the claim attribute refers to claim list components 4525 for the patent 4158634. In addition, have the 4158634th patent attribute, and refer to the 4158634th patent component 4511 for applicant the 4158634th patents list components 4523. Moreover, applicant list component 4524 of the 4313845th patent and claim list component 4525 of the 4158634th patent have the 4313845th patent attribute and refer to the 4313845th patent component 4512. Have both patent list attributes, and refer to patent list component 4500 for component 4511 of the 4158634th patent and component 4512 of the 4313845th patent.

Oppositely, the collection set of identification number list component 4510 to be referred is each person component 4520,4521,4522 to be identified. The collection set of person A component 4520 to be identified to be referred is applicant A1 component 4530 and applicant A2 component 4532. The collection set of person B component 4521 to be identified to be referred is applicant B1 component 4531. The collection set of person C component 4522 to be identified to be referred is applicant C1 component 4532. Moreover, patent list component 4500 has the 4158634th patent component 4511 and the 4313845th patent component 4512 as a collection set to be referred. Moreover, the 4158634th patent component 4511 has applicant the 4158634th patents list components 4523 as a collection set to be referred. In addition, you may generate the claim the 4158634th patents outside figure list components, and add to the collection set to be referred. Moreover, the 4313845th patent component 4512 has applicant the 4313845th patents list components 4523 and claim the 4313845th patents list components 4525 as a collection set to be referred. The collection set of applicant the 4158634th patents list components 4523 to be referred is applicant A1 component 4530 and applicant B1 component 4531. The collection set of applicant the 4313845th patents list components 4524 to be referred is applicant A2 component 4532 and applicant C1 component 4533. The collection sets of claim the 4313845th patents list components 4525 to be referred are 1 the 4313845th patent component 4534 in the claim and 2 the 4313845th patent components 4535 in the claim.

Figure 8:
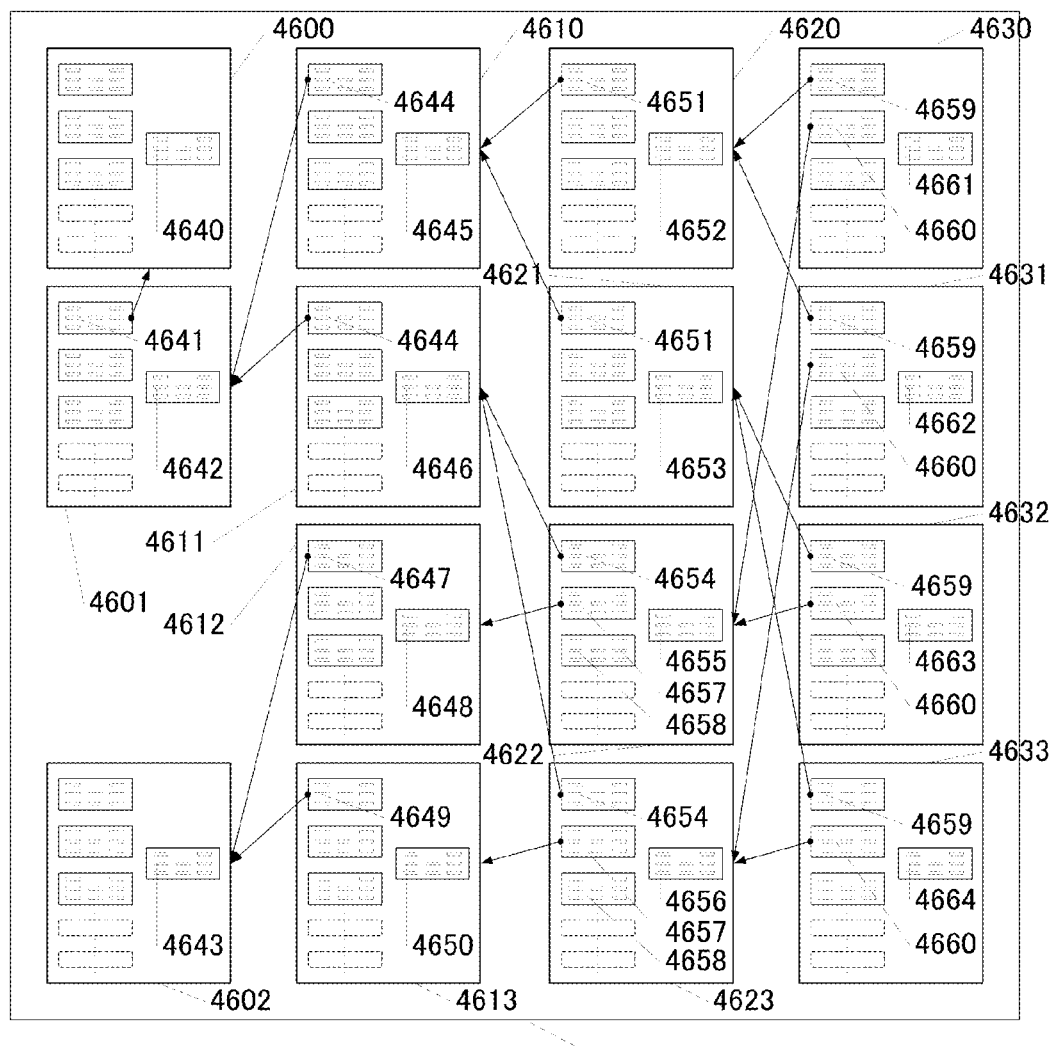
FIG. 8 is an example of composition of the in-memory relational database by the combination of the said cell object component apparatus/apparatuses 400 (Embodiment 2).

Embodiment 2: Working example of the in-memory relational database system according to claim 4 by the combination of the said cell object component apparatus/apparatuses 400 (following component) given in FIG. 6_is indicated to FIG. 8. Said the in-memory relational database system, In said the in-memory object oriented database system, It restrains and specializes by the list component which manages respectively a cell component, a tuple component, an attribute component, a type component, a relation component, and each component.

In FIGS. 8, 4830, 4831, 4832, and 4833 are the components of the cell specified by tuple ID and attribute ID, Have a value of each cell as value and the component of said cell, As a cell component, respectively, it has a tuple attribute and an attribute (attribute) and refer to the respectively corresponding attribute components 4622 and 4623 for an attribute (attribute) with reference to the tuple components 4620 and 4621 in which a tuple attribute corresponds respectively. Each tuple components 4620 and 4621 have a tuple attribute list, With reference to the tuples list component 4610, each attribute components 4622 and 4623, It has an attributes list attribute and a type attribute, and an attributes list attribute refers to the type list component 4601 for a type attribute with reference to the attributes list component 4611. Other components are not referred to although the attribute components 4622 and 4623 have a data length attribute in others. The tuples list component 4610 and the attributes list component 4611 refer to the corresponding relation component 4601, The relation component 4601 has a relation list attribute, and refer to the relation list component 4600 for it.

On the contrary, the relation list component 4600, It has a collection set which comprises the relation component 4601, Specify the specific relation component 4601 and this relation component 4601, It has a collection set which comprises the collection set and the attributes list component 4611 which comprise the tuples list component 4610 which refers to this relation component 4601. Each tuples list component 4610 has a collection set which comprises the tuple components 4620 and 4621. The attributes list component 4611 has a collection set which comprises the attribute components 4622 and 4623. Tuple 1 and the component 4620 have a collection set which comprises the cell components 4630 and 4631, Tuple 2 and the component 4621 have a collection set which comprises the cell components 4632 and 4633, and attribute 1 and the component 4622, Have a collection set which comprises the cell components 4630 and 4632, and attribute 2 and the component 4623, A cell component can be specified by having a collection set which comprises the cell components 4631 and 4633, and specifying a specific tuple component and a specific attribute component.

Embodiment 3: Deployment working example on the main memory unit of the in-memory XML database system according to claim 5 by the combination of the said cell object component apparatus/apparatuses 400 (following component) given in FIG. 6 is indicated to FIG. 9. In said the in-memory object oriented database system, by 1 or two or more tag components, and a tag list component, said the in-memory XML database system is restrained, and specializes.

Figure 9:
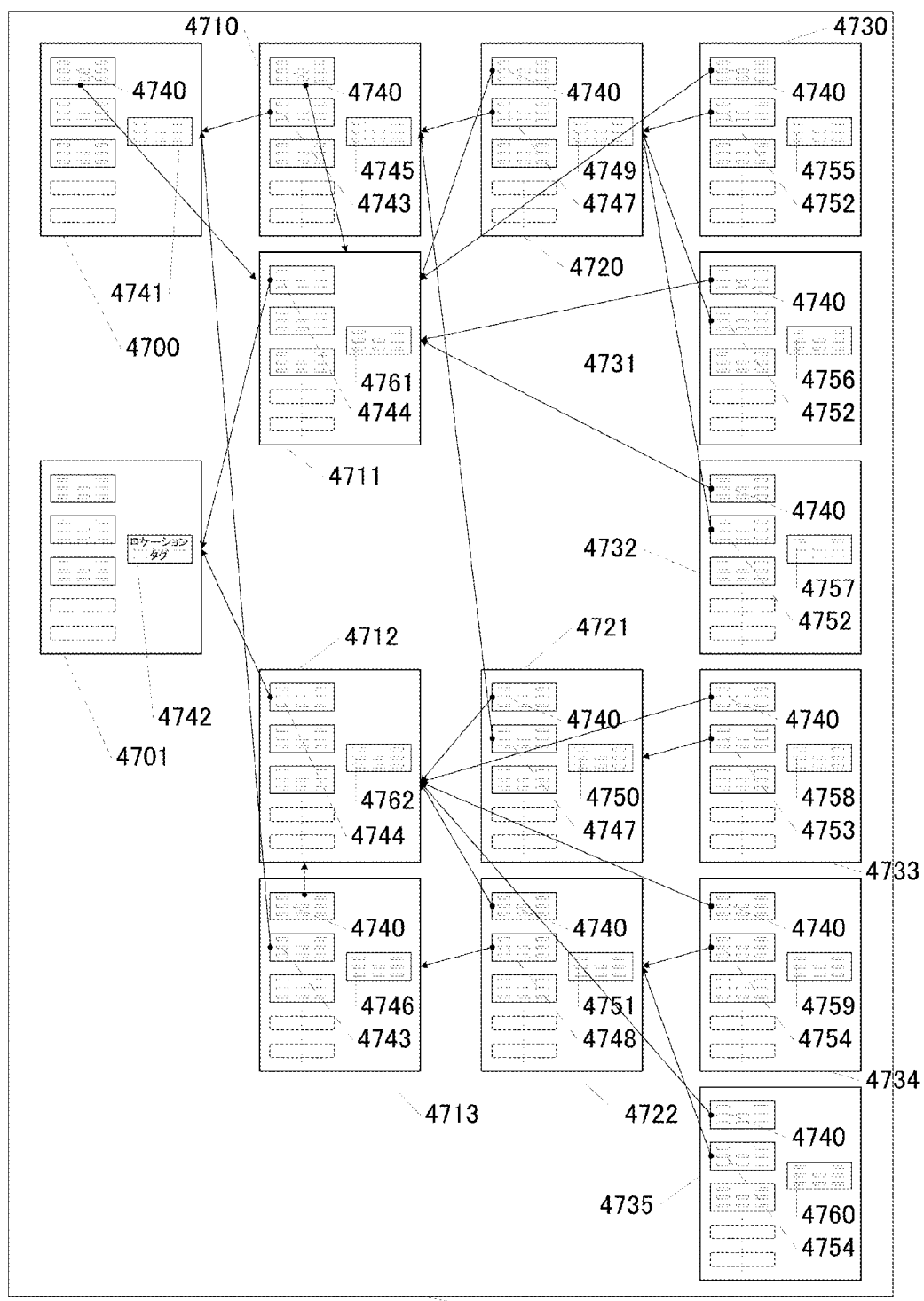
FIG. 9 is an example of deployment composition on the main memory unit of the in-memory one and the XML database by the combination of the said cell object component apparatus/apparatuses 400 (Embodiment 3).

4730, 4731, 4732, 4733, 4734, 4735 is a belonging classification tag component in FIG. 9 that specifies the classification of belonging of various fish. It has each belonging classification tag name as value, and each belonging classification tag component 4730, 4731, 4732, 4733, 4734, 4735 has fish's department classification tag attribute corresponding to the classification of belonging of the tag list attribute and the corresponding fish. The tag list attribute refer to corresponding tag list component 4711, 4712. The department classification attribute refers to department classification component 4720, 4721, 4722 of the corresponding fish. Each said tag list component 4711, 4712 have the location tag attribute, and refer to location component 4701.

4720,4721,4722 has each family classification tag name as value, and each family classification tag component 4720, 4721,4722 has fish's order classification tag attribute corresponding to the family classification of the tag list attribute and the corresponding fish.

The tag list attribute refers to corresponding tag list component 4711,4712. The order classification tag attribute refers to order classification component 4710,4713 of the corresponding fish. Each said tag list component 4711,4712 have the location tag attribute, and refer to location component 4701.

Moreover, each said fish's order classification component 4710,4713 has each order classification tag name as value. Each order classification tag component 4710,4713 must have fish's fishes tag attribute corresponding to the order classification of the tag list attribute and the corresponding fish, and refer to corresponding tag list component 4711,4712 for the tag list attribute. The fishes tag attribute refers to corresponding fishes classification component 4700. Each said tag list component 4711,4712 have the location tag attribute, and refer to location component 4701.

Oppositely, location component 4701 has the collection set composed of tag list component 4711, 4712. A specific tag list component is specified, and one tag list component 4711 has the collection set composed of various components 4720, 4730, 4731, 4732 that refer to the corresponding tag list component. Two tag list components 4712 have the collection set composed of various components 4721, 4722, 4733, 4734, 4735 that refer to the tag list component. Moreover, the fishes classification component has the collection set composed of order classification component 4710, 4713. In addition, Perciformes order classification component 4710 has the collection set composed of the department classification component 4720, 4721. Moreover, the Salminiformes order classification component has the collection set composed of family classification component 4722. In addition, Scombridae family classification component 4720 has the collection set composed of genus classification component 4730, 4731, 4732. Moreover, Percichthyidae family classification component 4721 has the collection set composed of genus classification component 4733. Moreover, Salminidae family classification component 4722 has the collection set composed of genus classification component 4734, 4735. As a result, you may construct the XML data base that classifies fishes for instance, and use it for the retrieval service as Inn memory XML database system. Moreover, you may acquire the tag list that composes this component of the location component, acquire necessary tag from each tag list, and acquire the corresponding content. As a result, it becomes possible to acquire necessary information from arbitrary tag without developing all the XML documents on the memory like SAX like DOM.

Industrial Field Application

The data of the file of business documents, such as an estimate which is attached to the E-mail which the employee sent to external by the internal control of a company or strengthening of compliance, and its E-mail, and is exchanged for them, and a purchase order, which must be kept as vestiges on a performing a task for a long period of time is continuing increasing every day. And the situation where a specific document must be found out and submitted for a short time by the operation demand of the sudden inspection from supervisor ministries and government offices or audit is also generated. Grant of the attribute to the data concerned based on a tag is being attained by keeping it as XML data of extraction after storage of the data concerned, the notes for a right interpretation, etc.

However, XML data will have redundant additional information of a tag in a data body. compared with the time XML began to be devised and used, data is boiled markedly and has been scaled out. There are the method of mainly using DOM as the method of de-serialization of XML data and art which uses SAX. Instead of placing the whole XML data on a main memory unit, DOM is the structure which can carry out direct access to every portion of XML data. On the other hand, SAX analyzes information, setting large-scale XML data by the capacity of a main memory unit in order from a route to an end, and developing on a main memory unit. When this invention is used for de-serialization of an XML document, it is not necessary to develop all the data on a main memory unit like DOM. It becomes possible to read only the required portion of the document written by XML data to a main memory unit, and to offer it, without reading data from the route like SAX.

Since construction of the distributed database over a node can also be made easy, it is convenient for construction of SOA systems including SCN. The said cell object component apparatus/apparatuses 400 given in FIG. 6 used as the core of this invention, The reference to self from it being possible to connect the relation which refers to other cell object component devices which are different attributes of not only one piece but plurality from the first. By string attachment not only by the reference which goes to the upper stream of the component parts in the production BOM used actually, or material but the product and shipment lot which were shipped. It is possible to limit the specification of the manufacture lot of a product and a shipment lot and the recovery of a product which were specified [ of the product which includes unsuitable raw material to the parts and environment of a malfunction/specification and there] to a part for a specific lot, and to contribute the loss by recovery to minimization and a cause inquiry.

Reference Numerals

1 Key
2 Value
3 Key value model data structure
11 and 21 Line ID
12, 13, 22, and 23 Column
14 Line ID of the reference table currently referred to first
15 Line ID of the reference table currently referred to first
16 The number of lines of the reference table which is referring to the -ed reference table
24 Line ID of the referenced table of the reference destination of a reference table
25 ID of the line which is referring to the line of the referenced table same immediately before
26 ID of the line which is referring to the line of the referenced table same immediately after
100 Reference referenced two-ways type cell object element device
110 Cell object storage
111 Object ID (key)
112 Value
120 Reference cell object component information storage apparatus/apparatuses
121 Reference destination cell object component information (substantially location information)
122 Cell object component information just before making a reference destination the same (substantially location information)
123 Cell object component information immediately after making a reference destination the same (substantially location information)
130 Reference cell object component information storage apparatus/apparatuses
131 Cell object component information which refers to an own cell object component first (substantially location information)
132 Cell object component information which refers to an own cell object component at the end (substantially location information)
133 The number of a cell object component which refers to an own cell object component
200 Referenced type cell object element device
201 The instance of the referenced type cell object element device 200
210 Cell object storage
211 Object ID (key)
212 Value
220 and 230 Reference cell object component information storage apparatus/apparatuses
221 and 231 Cell object component information which refers to an own cell object component first (substantially location information)
222 and 232 Cell object component information which refers to an own cell object component at the end (substantially location information)
223 and 233 The number of a cell object component which refers to an own cell object component
300 Referred to type cell object element device
301, 302, and 300+n Instance of the referred to type cell object element device 300 (the number of the cell object component in which an own cell object component refers to n)
310 Cell object storage
311 Object ID (key)
312 Value
320, 330 reference-cell object component information storage apparatus/apparatuses
321 and 331 Reference destination cell object component information (substantially location address)
322 and 332 Cell object component information just before making a reference destination the same (substantially location information)
323 and 333 Cell object component information immediately after making a reference destination the same (substantially location information)
400 Cell object component device
4500, 4510, 4511, 4512, 4520, 4521, 4522, 4523, 4524, 4525, 4530, 4531, 4532, 4533, The instance of the cell object component device 400 for explaining the example of composition of 4534 and a 4535 the in-memory object oriented database 4500 Component apparatus of the Patent list
4510 Component apparatus of the ID number list
4511 Component apparatus of the Patent 4158634
4512 Component apparatus of the Patent 4313845
4520 Component apparatus of the person identified ID number A
4521 Component apparatus of the person identified ID number B
4522 Component apparatus of the person identified ID number C
4523 Component apparatus of the applicants list of Patent 4158634
4524 Component apparatus of the applicants list of Patent 4313845
4525 Component apparatus of the claims list of Patent 4313845
4530 Component apparatus of the applicant A1
4531 Component apparatus of the applicant B1
4532 Component apparatus of the applicant A2
4533 Component apparatus of the applicant C1
4534 Component apparatus of the claim 1 of Patent 4313845
4535 Component apparatus of the claim 2 of Patent 4313845
4541 Attributes of the ID number
4542 Attributes of the identified number
4543 Identified person A
4544 Identified person B
4545 Identified person C
4546 List of the ID number
4547 Attributes of the applicant
4548 Name of the applicant A
4549 Name of the applicant B
4550 Name of the applicant C
4551 List of patents
4552 Attributes of the patents list
4553 Patent 4158634
4554 Attributes of the patent 4158634
4555 List of applicants of patent 4158634
4556 Patent 4313845
4557 Attribute of the patent 4313845
4558 List of applicants of patent 4313845
4559 List of claims of patent 4313845
4560 Attributes of the claim
4561 claim 1
4562 claim 2
4600 The instance of the cell object component device 400 for managing a database
4601 The instance of the cell object component device 400 for managing relation
4602 The instance of the cell object component device 400 for managing a data type group
4610 The instance of the cell object component device 400 for managing a tuple ID group
4611 The instance of the cell object component device 400 for managing an attribute group
4612 Instance 1 of the cell object component device 400 for managing a data type
4613 Instance 2 of the cell object component device 400 for managing a data type
4620 Instance 1 of the cell object component device 400 for managing tuple ID
4621 Instance 2 of the cell object component device 400 for managing tuple ID
4622 Instance 1 of the cell object component device 400 for managing an attribute
4623 Instance 2 of the cell object component device 400 for managing an attribute
4630 Instance 1 of the cell object component device 400 for managing a cell
4631 Instance 2 of the cell object component device 400 for managing a cell
4632 Instance 3 of the cell object component device 400 for managing a cell
4633 Instance 4 of the cell object component device 400 for managing a cell
4640 Relation list
4641 Attributes of the relation list
4642 Relation 1
4643 Type list
4644 Attributes of the relation
4645 Tuples list
4546 Attributes list
4647 Type 1
4648 Numeric value
4649 Type 2
4650 Text value
4651 Attributes of the tuple list
4652 Tuple 1-ID
4653 Tuple 2-ID
4654 Attributes of the attributes list
4655 Attribute 1-ID
4656 Attribute 2-ID
4657 Attributes of the type
4658 Data length
4659 Attributes of the tuple
4660 Attributes of the attribute
4661 Value of cell 11
4662 Value of cell 12
4663 Value of cell 21
4664 Value of cell 22
4701 The instance of the cell object component device 400 for managing the location of a tag list
4711 and 4712 Instance of the cell object component device 400 for managing a tag list
4700, 4710, 4720, 4730, 4731, and 4732 The cell object component device 400 for managing the tag elements which refer to respectively the instance 4711 of the cell object component device 400 for managing a tag list. Instance
4713, 4721, 4722, 4733, 4734, 4735 The instance of the cell object component device 400 for managing the tag elements which refer to respectively the instance 4712 of the cell object component device 400 for managing a tag list
4740 Attributes of tag list
4741 Tag of fish classification
4742 Tag of location
4743 Attributes of tag of fish classification
4744 Attributes of tag of location
4745 Tag of Perciformes order
4746 Tag of Salminiformes order
4747 Attributes of tag of Perciformes order
4748 Attributes of tag of Salminiformes order
4749 Tag of Scombridae family
4750 Tag of Percichthyidae family
4751 Tag of Salminidae family
4752 Attributes of tag of Scombridae family
4753 Attributes of tag of Percichthyidae family
4754 Attributes of tag of Salminidae family
4755 Tag of *Scomber* genus
4756 Tag of *Thunnus* genus
4757 Tag of *Katsuwonus* genus
4758 Tag of *Lateolabrax* f genus
4759 Tag of *Oncorhynchus* genus
4760 Tag of *Salvelinus* genus 4761 Tag of tag list 1
4762 Tag of tag list 2
500 The example of composition of the in-memory object oriented database by the combination of the said cell object component apparatus/apparatuses 400
600 The example of composition of the relational database by the combination of the said cell object component apparatus/apparatuses 400
700 The example of deployment composition to the main memory unit of the XML database by the combination of the said cell object component apparatus/apparatuses 400

What is claimed is:

1. Cell object component apparatus/apparatuses which being stationed in the main memory of a set of the computer which having at least a CPU and a main memory module wherein having one or more refer active/passive dual-type cell object element apparatus/apparatuses, said cell object component apparatus/apparatuses characterized in followings:

herein said refer active/passive dual-type cell object element apparatus/apparatuses, wherein having:

one or more cell object element identifier storage unit for storing cell object element identifiers which identifying said refer active/passive dual-type cell object element apparatus/apparatuses, one or more cell object element value storage unit for storing any value in said refer active/passive dual-type cell object element apparatus/apparatuses, refer passive cell object component information storage apparatus for storing information of one or more cell object component apparatus/apparatuses that being referred by other said cell object component apparatus/apparatuses, and, refer active cell object component information storage apparatus/apparatuses for storing information of one or more said cell object component apparatus/apparatuses that referring to other said cell object component apparatus/apparatuses, herein said refer active cell object component information storage apparatus, wherein having at least:

cell object component identifier storage unit for storing cell object component identifier of other said cell object component apparatus/apparatuses which said cell object component apparatus/apparatuses referring to, previous refer active cell object component identifier storage unit for storing said cell object component identifiers of the said cell object component apparatus which refers to the other said cell object component apparatus which is referred by the other said cell object component apparatus last before, and, next refer active cell object component identifier storage unit for storing said cell object component identifiers of said cell object component apparatus which refers to the other said cell object component apparatus which is referred by the other said cell object component apparatus first after, herein said refer passive cell object component information storage apparatus/apparatuses, wherein having at least:

first refer active cell object component identifier storage unit for storing said cell object component identifiers of said cell object component apparatus which refers to the other said cell object component apparatus first, and, end refer active cell object component identifier storage unit for storing cell object component identifiers of said cell object component apparatus which refers to the other said cell object component apparatus last.

2. Cell object component apparatus/apparatuses which being stationed in the main memory of a set of the computer which having at least a CPU and a main memory module wherein having one or more refer active cell object element apparatus/apparatuses and one or more refer passive cell object element apparatus/apparatuses, said cell object component apparatus/apparatuses characterized in followings:

herein said refer active cell object element apparatus/apparatuses, wherein having:

one or more cell object element identifier storage unit for storing cell object element identifiers which identifying said refer active cell object element apparatus/apparatuses, one or more cell object element value storage unit for storing any value in said refer active cell object element apparatus/apparatuses, and, refer active cell object component information storage apparatus/apparatuses for storing information of one or more said cell object component apparatus/apparatuses that referring to other said cell object component apparatus/apparatuses, herein said refer passive cell object element apparatus/apparatuses, wherein having:

one or more cell object element identifier storage unit for storing cell object element identifiers which identifying said refer passive cell object element apparatus/apparatuses, one or more cell object element value storage unit for storing any value in said refer passive cell object element apparatus/apparatuses, and, refer passive cell object component information storage apparatus/apparatuses for storing information of one or more said cell object component apparatus/apparatuses that being referred by other said cell object component apparatus/apparatuses, herein said refer active cell object component information storage apparatus, wherein having at least:

cell object component identifier storage unit for storing cell object component identifier of other said cell object component apparatus/apparatuses which said cell object component apparatus/apparatuses referring to, previous refer active cell object component identifier storage unit for storing said cell object component identifiers of the said cell object component apparatus which refers to the other said cell object component apparatus which is referred by the other said cell object component apparatus last before, and, next refer active cell object component identifier storage unit for storing said cell object component identifiers of said cell object component apparatus which refers to the other said cell object component apparatus which is referred by the other said cell object component apparatus first after, herein said refer passive cell object component information storage apparatus/apparatuses, wherein having at least:

first refer active cell object component identifier storage unit for storing said cell object component identifiers of said cell object component apparatus which refers to the other said cell object component apparatus first, and, end refer active cell object component identifier storage unit for storing cell object component identifiers of said cell object component apparatus which refers to the other said cell object component apparatus last.

3. In-memory object-oriented database system which being stationed in the main memory of a set of the computer which having at least a CPU and a main memory module, In-memory object-oriented database system characterized in followings:

herein In-memory object-oriented database system comprises one or more said cell object component apparatus/apparatuses, wherein said cell object component apparatus/apparatuses having one of:

one or more refer active/passive dual-type cell object element apparatus/apparatuses, one or more refer active cell object element apparatus/apparatuses and one or more refer passive cell object element apparatus/apparatuses, one or more refer active/passive dual-type cell object element apparatus/apparatuses and one or more refer active cell object element apparatus/apparatuses, one or more refer active/passive dual-type cell object element apparatus/apparatuses and one or more refer passive cell object element apparatus/apparatuses, and, one or more refer active/passive dual-type cell object element apparatus/apparatuses and one or more refer active cell object element apparatus/apparatuses and one or more refer passive cell object element apparatus/apparatuses, said refer active/passive dual-type cell object element component apparatus having:

one or more cell object element identifier storage unit for storing cell object element identifiers which identifying said refer active/passive dual-type cell object element apparatus/apparatuses, one or more cell object element value storage unit for storing any value in the said refer active/passive dual-type cell object element apparatus, refer passive cell object component information storage apparatus for storing information of itself or other one or more said cell object component apparatus/apparatuses which being referred by said cell object component apparatus/apparatuses referring, and, refer active cell object component information storage apparatus for storing information of itself or other one or more said cell object component apparatus/apparatuses which referring to said cell object component apparatus/apparatuses, said refer active cell object element apparatus/apparatuses having:

one or more cell object element identifier storage unit for storing cell object element identifiers which identifying said refer active cell object element apparatus/apparatuses, one or more cell object element value storage unit for storing any value in said refer active cell object element apparatus/apparatuses, and, refer active cell object component information storage apparatus for storing information of itself or other one or more cell object component apparatus/apparatuses which being referred by said cell object component apparatus/apparatuses, said refer passive cell object element apparatus/apparatuses having:

one or more cell object element identifier storage for storing cell object element identifiers which identifying said refer passive cell object element apparatus/apparatuses, one or more cell object element value storage unit for storing any value in said refer passive cell object element apparatus/apparatuses, and, refer passive cell object component information storage apparatus for storing information of itself or said other one or more cell object component apparatus/apparatuses which referring to said cell object component apparatus/apparatuses, herein said refer active cell object component information storage apparatus, wherein having at least:

cell object component identifier storage unit for storing cell object component identifier of other said cell object component apparatus/apparatuses which said cell object component apparatus/apparatuses referring to, previous refer active cell object component identifier storage unit for storing said cell object component identifiers of the said cell object component apparatus which refers to the other said cell object component apparatus which is referred by the other said cell object component apparatus last before, and, next refer active cell object component identifier storage unit for storing said cell object component identifiers of said cell object component apparatus which refers to the other said cell object component apparatus which is referred by the other said cell object component apparatus first after, herein said refer passive cell object component information storage apparatus/apparatuses, wherein having at least:

first refer active cell object component identifier storage unit for storing said cell object component identifiers of said cell object component apparatus which refers to the other said cell object component apparatus first, and, end refer active cell object component identifier storage unit for storing cell object component identifiers of said cell object component apparatus which refers to the other said cell object component apparatus last.

4. In-memory relational database system which being stationed in the main memory of a set of the computer which having at least a CPU and a main memory module, said In-memory relational database system characterized in followings:

said In-memory relational database system having:

one or more cell object component apparatus/apparatuses for managing database, said one or more cell object component apparatus/apparatuses characterized in followings:

herein said refer active cell object element apparatus/apparatuses, wherein having—one or more cell object element identifier storage unit for storing cell object element identifiers which identifying said refer active cell object element apparatus/apparatuses, one or more cell object element value storage unit for storing any value in said refer active cell object element apparatus/apparatuses, and, refer active cell object component information storage apparatus/apparatuses for storing information of one or more said cell object component apparatus/apparatuses that referring to other said cell object component apparatus/apparatuses, herein said refer passive cell object element apparatus/apparatuses, wherein having—one or more cell object element identifier storage unit for storing cell object element identifiers which identifying said refer passive cell object element apparatus/apparatuses, one or more cell object element value storage unit for storing any value in said refer passive cell object element apparatus/apparatuses, and, refer passive cell object component information storage apparatus/apparatuses for storing information of one or more said cell object component apparatus/apparatuses that being referred by other said cell object component apparatus/apparatuses, herein said refer active cell object component information storage apparatus, wherein having at least: cell object component identifier storage unit for storing cell object component identifier of other said cell object component apparatus/apparatuses which said cell object component apparatus/apparatuses referring to, previous refer active cell object component identifier storage unit for storing said cell object component identifiers of the said cell object component apparatus which refers to the other said cell object component apparatus which is referred by the other said cell object component apparatus last before, and, next refer active cell object component identifier storage unit for storing said cell object component identifiers of said cell object component apparatus which refers to the other said cell object component apparatus which is referred by the other said cell object component apparatus first after, herein said refer passive cell object component information storage apparatus/apparatuses, wherein having at least: first refer active cell object component identifier storage unit for storing said cell object component identifiers of said cell object component apparatus which refers to the other said cell object component apparatus first, and, end refer active cell object component identifier storage unit for storing cell object component identifiers of said cell object component apparatus which refers to the other said cell object component apparatus last;

said In-memory relational database system comprising:

one or more said cell object component apparatus/apparatuses for managing data type set, to which said In-memory relational database comprising:

one or more said cell object component apparatus/apparatuses for managing data type which referring to said cell object component apparatus/apparatuses respectively for managing said data type set, one or more said cell object component apparatus/apparatuses for managing the relation/relations which referring to said cell object component apparatus/apparatuses respectively for managing said database, one said cell object component apparatus for managing a group of attributes in two or more the other said cell object component apparatuses which referring to said cell object component apparatus/apparatuses respectively for managing said the relation/relations, one said cell object component apparatus for managing a group of tuple ID in two or more the other said cell object component apparatuses which referring to said cell object component apparatus/apparatuses respectively for managing said the relation/relations, one or more said cell object component apparatus/apparatuses for managing said attributes which referring to said cell object component apparatus/apparatuses to manage both said group of attributes and said data type respectively, and further more to store length of each data corresponding to each attribute for managing said group of attributes and which said a group of attributes comprising to, one or more said cell object component apparatus/apparatuses for managing one or more tuple ID/IDs which referring to said cell object component apparatus/apparatuses respectively for managing said a group of tuple IDs, and, one or more said cell object component apparatus/apparatuses for managing one or more cell/cells which referring to both said cell object component apparatus/apparatuses respectively for managing said attributes and said cell object component apparatus/apparatuses respectively for managing said tuple IDs.

5. In-memory XML database system which being stationed in the main memory of a set of the computer which having at least a CPU and a main memory module, said In-memory XML database system characterized in followings:

said In-memory XML database system having:

one or more cell object component apparatus/apparatuses for managing database, said one or more cell object component apparatus/apparatuses characterized in followings:

herein said refer active cell object element apparatus/apparatuses, wherein having—one or more cell object element identifier storage unit for storing cell object element identifiers which identifying said refer active cell object element apparatus/apparatuses, one or more cell object element value storage unit for storing any value in said refer active cell object element apparatus/apparatuses, and, refer active cell object component information storage apparatus/apparatuses for storing information of one or more said cell object component apparatus/apparatuses that referring to other said cell object component apparatus/apparatuses, herein said refer passive cell object element apparatus/apparatuses, wherein having—one or more cell object element identifier storage unit for storing cell object element identifiers which identifying said refer passive cell object element apparatus/apparatuses, one or more cell object element value storage unit for storing any value in said refer passive cell object element apparatus/apparatuses, and, refer passive cell object component information storage apparatus/apparatuses for storing information of one or more said cell object component apparatus/apparatuses that being referred by other said cell object component apparatus/apparatuses, herein said refer active cell object component information storage apparatus, wherein having at least: cell object component identifier storage unit for storing cell object component identifier of other said cell object component apparatus/apparatuses which said cell object component apparatus/apparatuses referring to, previous refer active cell object component identifier storage unit for storing said cell object component identifiers of the said cell object component apparatus which refers to the other said cell object component apparatus which is referred by the other said cell object component apparatus last before, and, next refer active cell object component identifier storage unit for storing said cell object component identifiers of said cell object component apparatus which refers to the other said cell object component apparatus which is referred by the other said cell object component apparatus first after, herein said refer passive cell object component information storage apparatus/apparatuses, wherein having at least: first refer active cell object component identifier storage unit for storing said cell object component identifiers of said cell object component apparatus which refers to the other said cell object component apparatus first, and, end refer active cell object component identifier storage unit for storing cell object component identifiers of said cell object component apparatus which refers to the other said cell object component apparatus last;

In-memory XML database system described comprising:

one or more said cell object component apparatus/apparatuses for managing tag list apparatus/apparatuses, to which said In-memory XML database system comprising:

one or more cell object component apparatus/apparatuses for managing the tag list which referring to cell object component, said location of tag list to which said In-memory XML database system comprising:

one or more said cell object component apparatus/apparatuses for managing control elements of tags which referring to said cell object component apparatus/apparatuses respectively for managing said tag list, and, one or more said cell object component apparatus/apparatuses for storing value of data which referring to said cell object component apparatus/apparatuses respectively for managing said control elements of tags, herein said cell object component apparatus/apparatuses for managing said control elements of tags is/are referred by cell object component apparatus/apparatuses to manage one or more other said control elements of tags or cell object component apparatus/apparatuses to store one or more said value of data recursively.

* * * * *